METHOD AND APPARATUS FOR FEEDING AND COATING A WEB

Original Filed Sept. 20, 1960 2 Sheets-Sheet 1

INVENTOR.
Angelo Vaccaro
BY
Johnson and Kline
ATTORNEYS

METHOD AND APPARATUS FOR FEEDING AND COATING A WEB

Original Filed Sept. 20, 1960 2 Sheets-Sheet 2

INVENTOR.
Angelo Vaccaro
BY
Johnson and Kline
ATTORNEYS

United States Patent Office

Re. 26,951
Reissued Sept. 22, 1970

26,951

METHOD AND APPARATUS FOR FEEDING AND COATING A WEB

Angelo Vaccaro, Port Washington, N.Y., assignor to Celanese Corporation, New York, N.Y., a corporation of Delaware Original No. 3,082,735, dated Mar. 26, 1963, Ser. No. 58,875, Sept. 20, 1960, which is a continuation-in-part of application Ser. No. 631,583, Dec. 31, 1956. Application for reissue Dec. 16, 1963, Ser. No. 339,569

Int. Cl. B05c *11/00;* B65h *17/44*

U.S. Cl. 118—6 14 Claims

Matter enclosed in heavy brackets [ ] appears in the original patent but forms no part of this reissue specification; matter printed in italics indicates the additions made by reissue.

*ABSTRACT OF THE DISCLOSURE*

*This invention deals with a method and apparatus for coating and conveying a web of plastic. The web is conveyed by establishing a non-uniform electrostatic field gradient between an electrode and said web to deposit on said web an electrostatic charge sufficient to cause said web to adhere to a rotating surface beneath it. The web is removed from said rotating surface by tensioning.*

This invention relates to feeding webs of flexible nonmetallic material such as textile cloth, paper and plastic films.

This application is a continuation-in-part of my application Ser. No. 631,583, filed Dec. 31, 1956, now abandoned.

A feature of the invention is the provision of means for advancing such webs by physical contact of a feeding means with one side only of the web.

Another feature is the provision of means for applying a drag on a portion of the web by physical contact of a tensioning means with one side only of the web.

A further feature is the provision of means for feeding such webs while maintaining a portion of the web under tension by feeding and tensioning means which each makes physical contact with solely one side of the web.

And still a further feature of the invention is the provision of web feeding and tensioning means which make physical contact with solely one and the same side of the web.

These features are attained according to the present invention by applying charges of static electricity to the web as it travels is intended path so that the web will adhere to the grounded metallic surfaces of the means employed to control the web.

In the case of the web feeding or advancing means, the metallic surface of a feed roller is grounded and the device for applying the electrostatic charge is located adjacent but spaced from a portion of the feed roller which is engaged by the web. The device for applying the electrostatic charge to the web is elongate and extends for substantially the full width of the web and preferably is located substantially midway between the points of tangency of the web with the roller. The static charge-supplying device is spaced from the web and does not make any physical contact with it. It has been found that with the charging device arranged as above stated, strong adhesion between the web and the metallic surface of the feed roller is obtained in the vicinity of the portion of the web which is statically charged. Yet, as the pull roller advances the web beyond the influence of the electrostatic charging device, the web becomes released from the pull roller and follows its otherwise guided path.

One of the advantages of this form of web feeding device is that the web may be fed without anything making physical contact with the side away from the feed roller and thus a coating on one side of the web may be lelt undisturbed during the feeding operation. This is important in connection with coating machines in which it is desirable to have the pulling or feeding roller close to the coating roller, which usually cannot be done with feeding devices which engage both sides of the web.

In the case of the tensioning device, in the preferred form of the invention, the metallic surface of a tension bar over which the web slides in being fed is grounded and the device for applying the static charge to the web is located adjacent but spaced from the tension bar to provide an air gap through which the web travels. The device is elongate and extends parallel with the tension bar. As the web passes over the tension bar it is provided with a static charge which causes it to have strong adhesion to the tension bar and thus be yieldably restrained from advancing. This is an important advantage especially in connection with coating machines, since the tension bar may thus be located close to the coating roller. If as is sometimes desired, the coating operation is a second or overcoating operation then it is advantageous to have the tension bar engage the uncoated side of the web, because according to the present invention no physical engagement with the other side of the web or any coatings thereon need be made.

In some situations, the tensioning device at the introductory side of the apparatus may be of conventional [instruction] *construction* in which the web is engaged on both surfaces by physical means.

It has been found however advantageous, especially in coating machines, to employ the electrostatic tensioning device of the present invention in conjunction with the electrostatic feeding device thereof, since the tension of the web where it passes over the coating roller and/or doctor roller may be closely controlled thereby avoiding undue stretching of the web which frequently causes a paper web to tree in passing over the feed roller.

Then tension applied by the electrostatic tensioning device of the present invention may be varied by changing the intensity of the static charge applied to the web.

Other features and advantages will hereinafter appear.

In the accompanying drawings—

Figure 1:
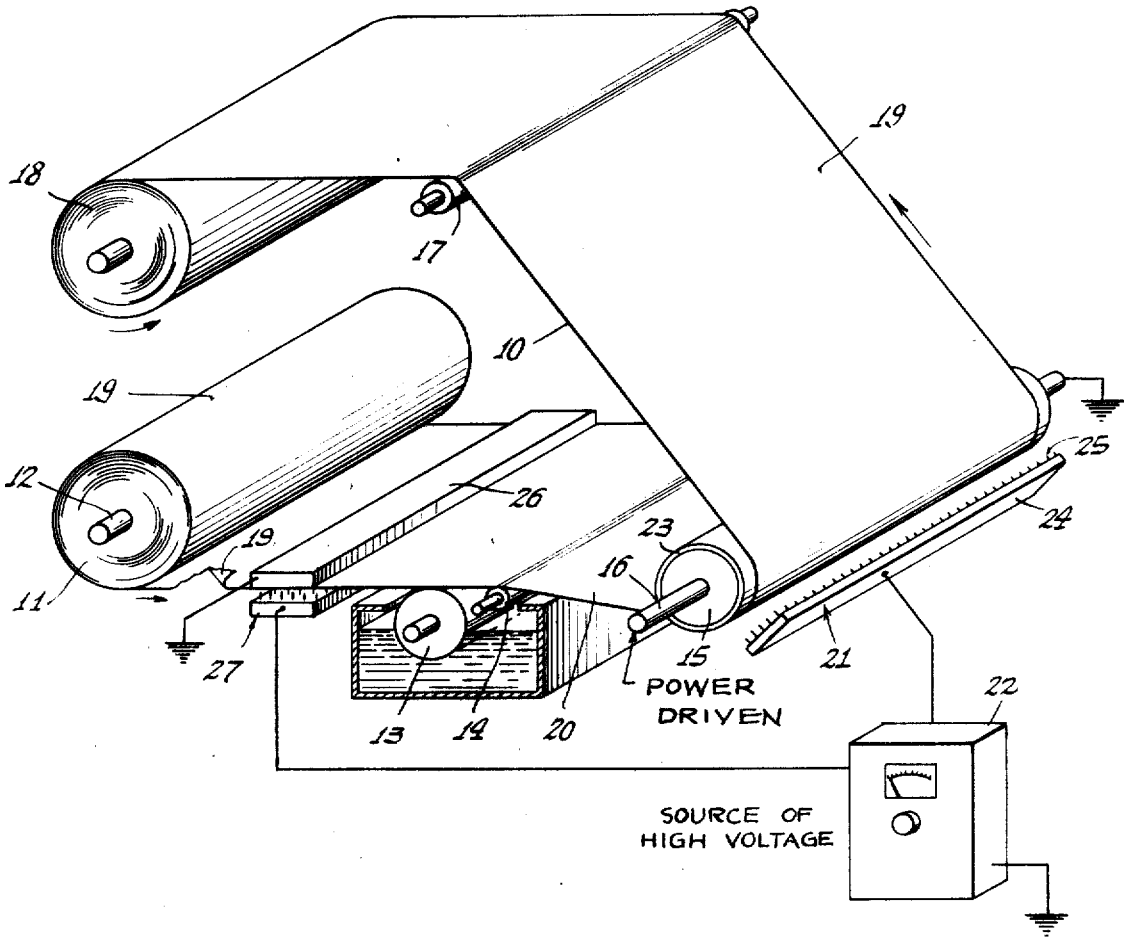
FIG. 1 is a schematic perspective view showing the present invention as applied to a coating machine.
Figure 2:
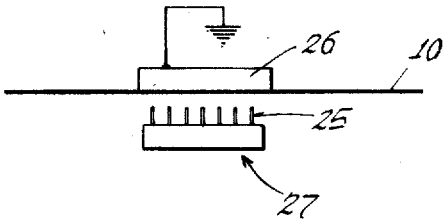
FIG. 2 is a schematic and view of a tensioning bar and a corona discharge device for applying an electrostatic charge to the web.
Figure 3:
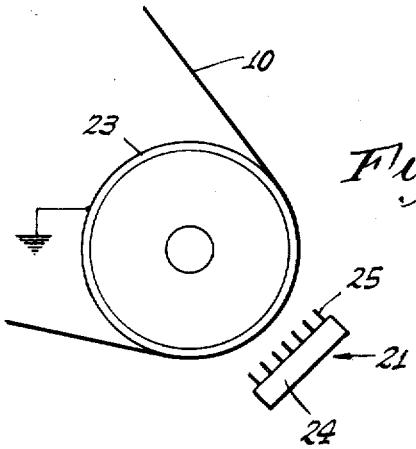
FIG. 3 is a view similar to FIG. 2 but showing the relationship between the feed roll and the corona discharge device with which the latter cooperates.

In the embodiment of the invention herein illustrated, the web 10 is shown as being led from a supply roll 11 mounted on an arbor 12 so that the web passes over an inking roller 13 and equalizer bar 14 and over a pull roller 15 mounted on a shaft 16. After leaving the pull roller 15, the web may pass over suitable guide rollers 17 and ultimately be wound on a take-up roll 18.

The arrangement thus far described is given as typical of many others wherein a web is taken from a supply roll, is acted on at one point in its path, and is advanced along that path, and finally rewound on another roll.

The arrangement shown differs from prior arrangements in that the web is advanced by the pull roller 15 without the necessity of making any physical contact with one surface of the web. As shown, the surface 19 of the web is engaged by the inking roller 13 and receives a coating for instance of transferable material therefrom, and after it passes over the equalizer bar 14 the web is led around the pull roller 15 so that the coated side is the outer side and the uncoated side 20 is in contact with the pull roller 15 which, as indicated, is power driven.

In order for the pull roller 15 to have any feeding engagement with the web without applying physical pressure to the coated side 19 of the web, the present invention provides adjacent the pull roller 15 a corona discharge device 21 connected to a source of high voltage 22 so that the web 10 is provided with an electrostatic charge and is thus attracted and adhered to the grounded surface 23 of the pull roller with sufficient tenacity to cause the web to be fed by the rotation of the pull roller.

The corona discharge device 21 as indicated in the drawings is preferably in the form of an elongate bar 24 having a plurality of spikes 25 directed toward the pull roller and the web thereon. The bar 24 is preferably located in a position somewhat spaced from the web 10 and about midway between the points of tangency of the web with the pull roller, although this is not critical so long as the discharge device is not located beyond the place where the web is to leave the pull roller.

It has been found that with the corona discharge device so located, the web of paper or the like capable of receiving and holding a static charge firmly adheres to the pull roller so as to be advanced thereby but becomes released from the pull roller soon after it passes the field of the corona discharge device and may therefore without intereference be led in other paths, for instance along the paths shown where it turns over the guide roller 17 and extends to the take-up roll 18.

Frequently, as in the case of the example illustrated where the web is to be coated, it is desired to maintain a predetermined tension on the web during the coating or other operations thereon. It has been found that this tension can also be provided for and yet make it unnecessary to engage both sides of the web. This is accomplished, in the example illustrated in FIGS. 1 and 4, by providing a brake member, such as the normally stationary tension bar 26, along the path of the web against which the web rides. Spaced from the tension bar there is a corona discharge device 27 which may be like the device 21 above described and which is connected to a source of high voltage so that the web 10 will be electrostatically charged and will be attracted to and adhesively engage the brake bar 26 which places a drag on the advancing web. The field strength of the corona may be varied to cause the web to be held more or less firmly to the brake bar 26, and thus by varying the strength of the field, the drag placed on the web as it is being advanced by the pull roller 15 may be varied to place the portion of the web which is passing over the inking roller 13 and the equalizer roller 14 under predetermined tension. As shown, the brake bar 26 engages the back side 20 of the web which is the same side that is engaged by the pull roller 15. This arrangement is particularly advantageous where it is desired to avoid attrition of one surface of the web. For example, it is advantageous to use this arrangement where the web has been previously coated on the surface 19 and is to be given an overcoat.

In some situations, especially where the web is contained on a large supply roll, the tension produced by the brake bar 26 and the electrostatic charging device 27 might vary as the diameter of the roll decreases, since the tension would be the result of the drag applied to the web by the brake bar 26 as well as by friction and other work which would have to be overcome in paying the web off the supply roll 11.

Figure 4:
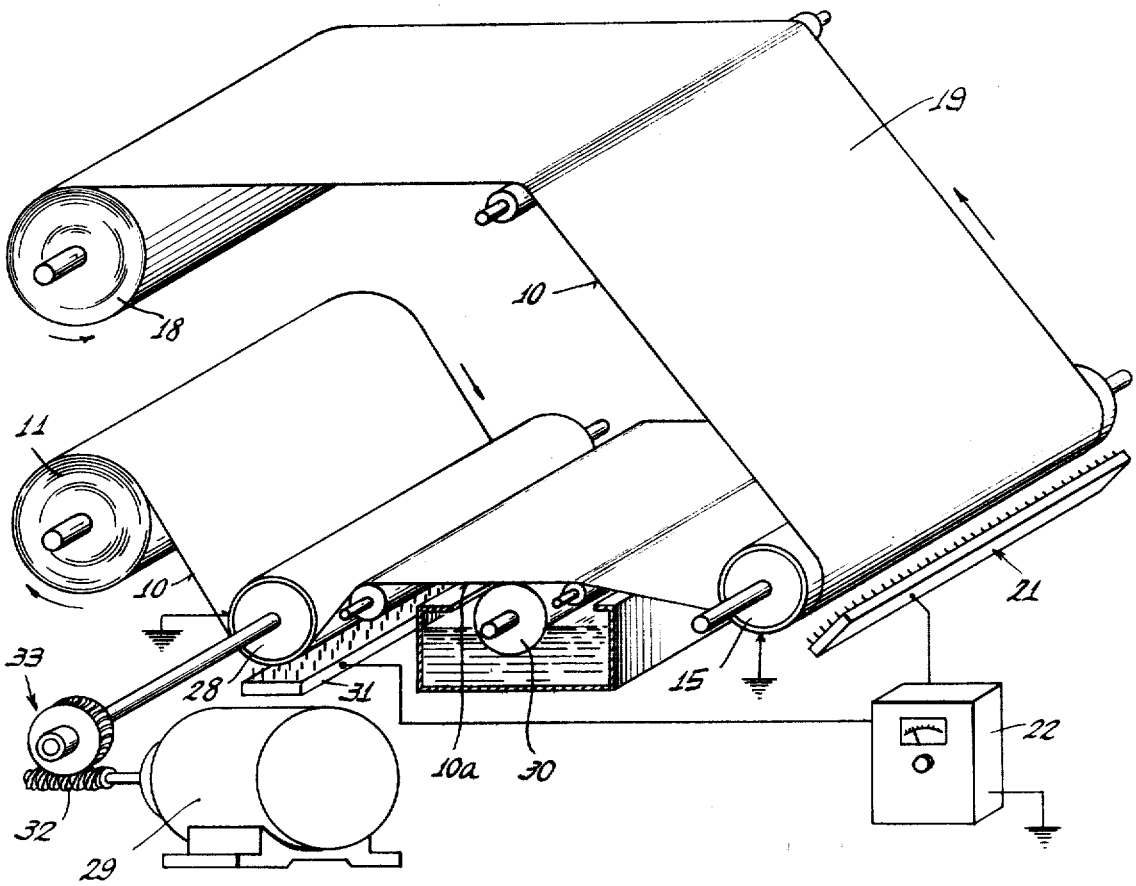
FIG. 4 is like FIG. 1, but shows another tensioning arrangement.

Under such circumstances where predetermined tension accurately and constantly maintained is desired, the present invention provides an additional pull roller 28 located between the supply roll 11 and the coating unit 30 or other processing unit as shown in FIG. 4, and this pull roller is rotated by a motor 29 or other source of power. Located adjacent the pull roller 28 is an electrostatic charging device 31 which performs the same function as the charging device 21 shown in FIG. 1 in causing the web to adhere to the grounded surface of the roller 28 and thus be pulled off the supply roll 11 when the latter rotates After the web 10 passes the coating unit 30, it passes around the pull roller 15 and is led to the take-up roll 18 as in the form shown in FIG. 1.

Thus it will be seen that the stretch 10a of the web which passes over the coating or other processing unit 30 is confined between the pull rollers 15 and 28. In order that this stretch 10a of the web may be maintained under a predetermined constant tension, the pull roller 28 is preferably provided with an overrunning preventing device such as an irreversible worm 32 in the drive 33 for the pull roller 28 so that the pull roller 15 may not advance the web any faster than the speed allowed by the pull roller 28. By adjusting the speeds of the pull roller 15 and the pull roller 28 so that the pull roller 15 tends to advance the web faster than the pull roller 28 permits, the desired tension on the stretch 10a may be obtained and maintained constant regardless of the size of the paying-off roll 11 or the effect of any other device which the web may engage before it reaches the pull roller 28.

As in the form shown in FIG. 1, the path of the web shown in FIG. 4 may be so arranged that only one side of the web is engaged by the pull rollers 28 and 15.

Figure 5:
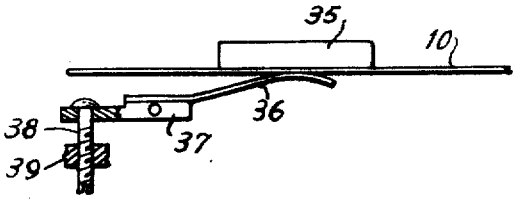
FIG. 5 is a view like FIG. 2, but shows a conventional tensioning device which may be used in place of the tensioning device shown in FIGS. 1 and 2.

In some situations, the electrostatic braking arrangement shown in FIGS. 1 and 4 at the introductory side of the apparatus may have substituted for it a conventional braking device such as shown in FIG. 5. As shown therein, the braking device comprises a pivoted non-traveling bar 35 and spring fingers 36 carried by a stationary bar 37. The web 10 is passed between the bar 35 and the fingers 36 which press the web against the bar 35 with yielding pressure so that the friction caused by the contact of the web with the bar 35 and spring fingers 36 apply a drag to the web. Preferably, the stationary bar 37 is adjustable so that the pressure applied to the web by the fingers and hence the drag may be varied as desired. For this purpose, the bar 35 is engaged by a screw 38 carried by a stationary bar 39. By adjusting the screw 38, the pressure applied to the web by the fingers 36 may be varied to increase or decrease the drag, and thus by cooperation of the pulling effect of the roller 23 at the delivery side of the apparatus may control the tension applied to the web as it passes the coating device 13.

Variations and modifications may be made within the scope of the claims and portions of the improvements may be used without others.

I claim:

1. A device for feeding a web from a supply of fabric and applying material to the front side thereof comprising a grounded power-operated pull roller engaging the back side of the web to draw the web from the supply and advance the web; processing means located between the pull roller and the supply roll at the front side of the web for applying coating material thereto; electrostatic tensioning means including a variable electrostatic charging means and a grounded tension device spaced to form a gap between itself and said charging means through which the web travels, said electrostatic tensioning means being located between the supply and the processing means, and a second electrostatic charging means spaced adjacent to but spaced from said pull roller to form between itself and said pull roller a gap through which the processed web travels for causing the back side of the web to engage said pull roller by electrostatic attraction and place a drag on the web to advance the same, the variable electrostatic charging means associated with the tension device causing the back side of the web to engage said tension device by electrostatic attraction and place a variable drag on the web, the difference in drag placed on the web passing over said tension device and passing over said pull roller being effective to place the portion of the web which is between said tension device and said pull roller under a predetermined tension.

2. A device for feeding a web and applying material to the front side thereof as defined in claim 1 in which the tension device comprises a stationary tension bar adapted to have frictional engagement with the back side of the web.

3. A device for feeding a web and applying material to the front side thereof as defined in claim 1 in which the grounded tension device located between the supply roll and the processing means comprises a pull roller positioned to frictionally engage the back side of the web and provided with a variable rotation-retarding device so that the amount of drag applied thereby to the web may be controlled.

4. A device for feeding a web from a supply of [fabric and applying material to the front side of said fabric] *material which is non-conductive of electricity* comprising a [grounded] power-operated pull roller frictionally engaging [the back] *a* side of the web to apply predetermined pulling force to the web to advance the latter; [processing means located between the pull roller and the supply at the front side of the web for applying coating material thereto;] grounded mechanical means located between the supply and the [processing means] *power-operated pull roller* and positioned to engage [the back] *a* side of the web to apply a predetermined tension to the web; and variable electrostatic charging means positioned to form between itself and said grounded mechanical means a gap through which the web travels, said variable electrostatic charging means causing [the back] *a* side of the web to engage said mechanical means by electrostatic attraction and placing a variable drag thereon, the difference between the drag placed on the web by said mechanical means and the predetermined pulling force applied by the pull roller causing a predetermined tension to be constantly maintained on said web between said pull roller and said mechanical means.

5. A device for feeding a web and controlling the tension of the web as it is fed from a first point to a second point comprising two grounded power-operated pull rollers *each* located to frictionally engage [one] *a* side of said web, one of said rollers being located at said first point to [pay out] *advance* said web and the other of said rollers being located at said second point to [take up the slack of] *receive* said fed web *from said one pull roller;* a first and second electrostatic charging means each adjacent to but spaced from [one of] said rollers to form between itself and its associated pull roller a gap in which said web travels while engaging the pull roller by electrostatic attraction and being advanced by the rotation of the rollers; and means for [variably] controlling the relative speeds of said pull rollers and maintaining a lower speed of [the] *said one* pull roller [for paying out the web] at said first point than of [the] *said other* pull roller [for taking up the slack of said web] at said second point, the difference in speed between said pull rollers being effective to cause a predetermined tension to be constantly maintained on said web between said first point and said second point.

6. In a device for feeding a web from a supply of [fabric] *material* which is non-conductive of electricity [and applying fluid material to the front side of the web] comprising a power-operated pull roller adapted to frictionally engage the back side of the web to apply pulling force to the web to advance the latter, [means for applying fluid located between the pull roller and the supply at the front side of the web,] brake means located between the supply and the [fluid applying means] *power-operated pull roller* to frictionally engage the back side of the web to apply a determinate drag on the web, the improvement which comprises means grounding the pull roller, means for applying an electrostatic charge to the web including [a group of electrodes] *electrode means* located adjacent but spaced from the grounded pull roller to form an air gap between said [electrodes] *electrode means* and the web, whereby, without physical engagement with the front side of the web, the web is pressed into frictional engagement with said pull roller with a determinate force by the electrostatic field emanating from said [electrodes] *electrode means,* and means for varying the relative effect on the web of the frictional engagement of said brake means and of said pull roller to control the tension of the web [as it passes the fluid applying means] *therebetween.*

7. A device for feeding a web from a supply of [fabric] *material* as defined in claim 6, in which the means for varying the relative effect of the frictional engagement of the brake means and of said pull roller on the web comprises means for varying the strength of the electrostatic field between said [electrodes] *electrode means* and said pull roller, whereby the friction between the web and the pull roller is increased or decreased.

8. A device for feeding a web from a supply of [fabric] *material* as defined in claim 6, in which the means for varying the relative effect of the frictional engagement of said brake means and of said pull roller on said web comprises means for adjusting said brake means to increase or decrease said determinate drag on the web.

9. A device for feeding a web from a supply of [fabric] *material* as defined in claim 6, in which there are means for grounding the brake means, means for applying an electrostatic charge to the web including a group of electrodes located adjacent to but spaced from the grounded brake means to form an air gap between said last-named electrodes and the web, whereby, without physical engagement with the front side of the web, the web is pressed into frictional engagement with said grounded brake means by the electrostatic field emanating from said last-named electrodes.

10. A device for feeding a web from a supply of [fabric] *material* as defined in claim 6, in which there are means for grounding the brake means, means for applying an electrostatic charge to the web including a group of electrodes located adjacent to but spaced from the grounded brake means to form an air gap between said last-named electrodes and the web, whereby, without physical engagement with the front side of the web, the web is pressed into frictional engagement with said grounded brake means by the electrostatic field emanating from said last-named electrodes, and means for varying the relative effect of the frictional engagement of said grounded brake means and said grounded pull roller on said web comprising means for varying the strength of the electrostatic field between said last-named electrodes and said grounded brake means.

*11. A process for transporting a traveling continuous web of plastic film which comprises:*

*(1) passing said web in proximity to but out of contact with at least one electrode and onto an electrically grounded rotating surface;*

*(2) establishing a non-uniform electrostatic gradient between said electrode and said web to deposit on the outer surface of said web an electrostatic charge sufficient to cause said web to adhere firmly to said rotating surface without adding a coating to the surface of said web which engages said rotating surface; and*

*(3) removing, essentially by tensioning, said web from said rotating surface and passing said web toward a take-up roll spaced from said rotating surface.*

*12. A process for transporting a traveling continuous web plastic film which comprises:*

*(1) passing said web in proximity to but out of contact with at least one electrode and onto an electrically grounded rotating surface;*

*(2) providing electrostatically charged particles at said electrode and establishing an electrostatic field between said electrode and said web to charge said web by depositing on the outer surface of said web an electrostatic charge sufficient to cause said web to adhere firmly to said rotating surface without adding a coating to the surface of said web which engages said rotating surface; and*

*(3) removing, essentially by tensioning, said web from said rotating surface and passing said web toward a take-up roll spaced from said rotating surface.*

*13. A process for transporting a traveling continuous web of plastic film which comprises:*

*(1) passing said web in proximity to but out of contact with at least one electrode and onto an electrically grounded power driven rotating surface;*

*(2) said power driven surface being located between a processing station and a take-up roll;*

*(3) isolating the tension in said web on the side of said power driven surface toward said processing station from the tension in said web on the other side of said power driven surface by establishing a non-uniform electrostatic field gradient between said electrode and said web to deposit on the outer surface of said web an electrostatic charge sufficient to cause said web to adhere firmly to said power driven surface without adding a coating to the surface of said web which engages said power driven surface; and*

*(4) removing, essentially by tensioning, said web from said power driven surface and passing said web toward a take-up roll spaced from said power driven surface.*

*14. A process for transporting a traveling continuous web of plastic film which comprises:*

*(1) passing said web in proximity to but out of contact with at least one electrode and onto an electrically grounded power driven rotating surface;*

*(2) said power driven surface being located between a processing station and a take-up roll;*

*(3) isolating the tension in said web on the side of said power driven surface toward said processing station from the tension in said web on the other side of said power driven surface by providing electrically charged particles at said electrode and establishing an electrostatic field between said electrode and said web to charge said web by depositing on the outer surface of said web an electrostatic charge sufficient to cause said web to adhere firmly to said power driven surface without adding a coating to the surface of said web which engages said power driven surface; and*

*(4) removing, essentially by tensioning, said web from said power driven surface and passing said web toward a take-up roll spaced from said power driven surface.*

References Cited

The following references, cited by the Examiner, are of record in the patented file of this patent or the original patent.

UNITED STATES PATENTS

| | | | |
|---|---|---|---|
| 2,684,901 | 7/1954 | Sabel et al. | 96—1.4 |
| 2,684,902 | 7/1954 | Mayo et al. | 96—1.4 |
| 2,701,765 | 2/1955 | Codichini et al. | 117—17 |
| 1,349,362 | 8/1920 | Chubb. | |
| 287,957 | 11/1883 | Osborne | 317—2 |
| 1,386,813 | 8/1921 | Townsend. | |
| 2,152,077 | 3/1939 | Meston et al. | |
| 2,221,338 | 11/1940 | Wintermute. | |
| 2,417,916 | 3/1947 | Dow. | |
| 2,447,374 | 8/1948 | Snyser. | |
| 2,724,562 | 11/1955 | Purdy. | |
| 2,731,212 | 1/1956 | Baker. | |
| 2,750,921 | 6/1956 | Purdy. | |
| 2,955,773 | 10/1960 | Burke. | |

ROBERT F. WHITE, Primary Examiner

R. SHEAR, Assistant Examiner

U.S. Cl. X.R.

118—33, 620; 226—1, 94; 264—22

PO-1050
(5/69)

UNITED STATES PATENT OFFICE
CERTIFICATE OF CORRECTION

Patent No. RE 26,951 Dated September 22, 1970

Inventor(s) A. Vaccaro

It is certified that error appears in the above-identified patent and that said Letters Patent are hereby corrected as shown below:

IN THE SPECIFICATION

Column 1, line 50, change "is" to "its".

Column 2, line 3, change "lelt" to "left".

IN THE CLAIMS

Column 6, line 60, the line should read -- (2) establishing a non-uniform electrostatic field gradient.

Column 8, lines 3-4, change "electrically" to "electrostatically".

SIGNED AND
SEALED
DEC 22 1970

(SEAL)
Attest:

Edward M. Fletcher, Jr.
Attesting Officer

WILLIAM E. SCHUYLER, JR.
Commissioner of Patents